Patented Feb. 24, 1931

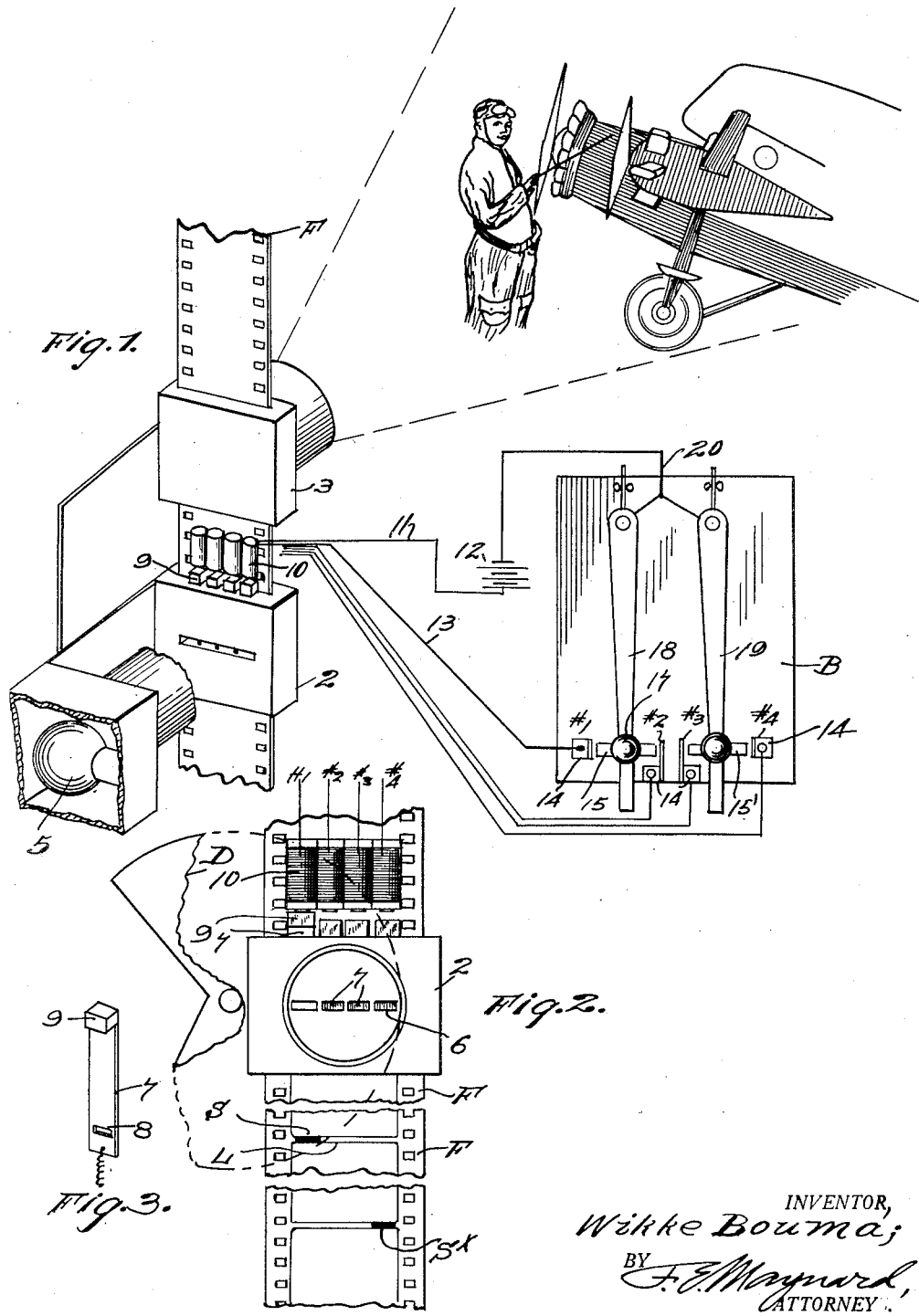

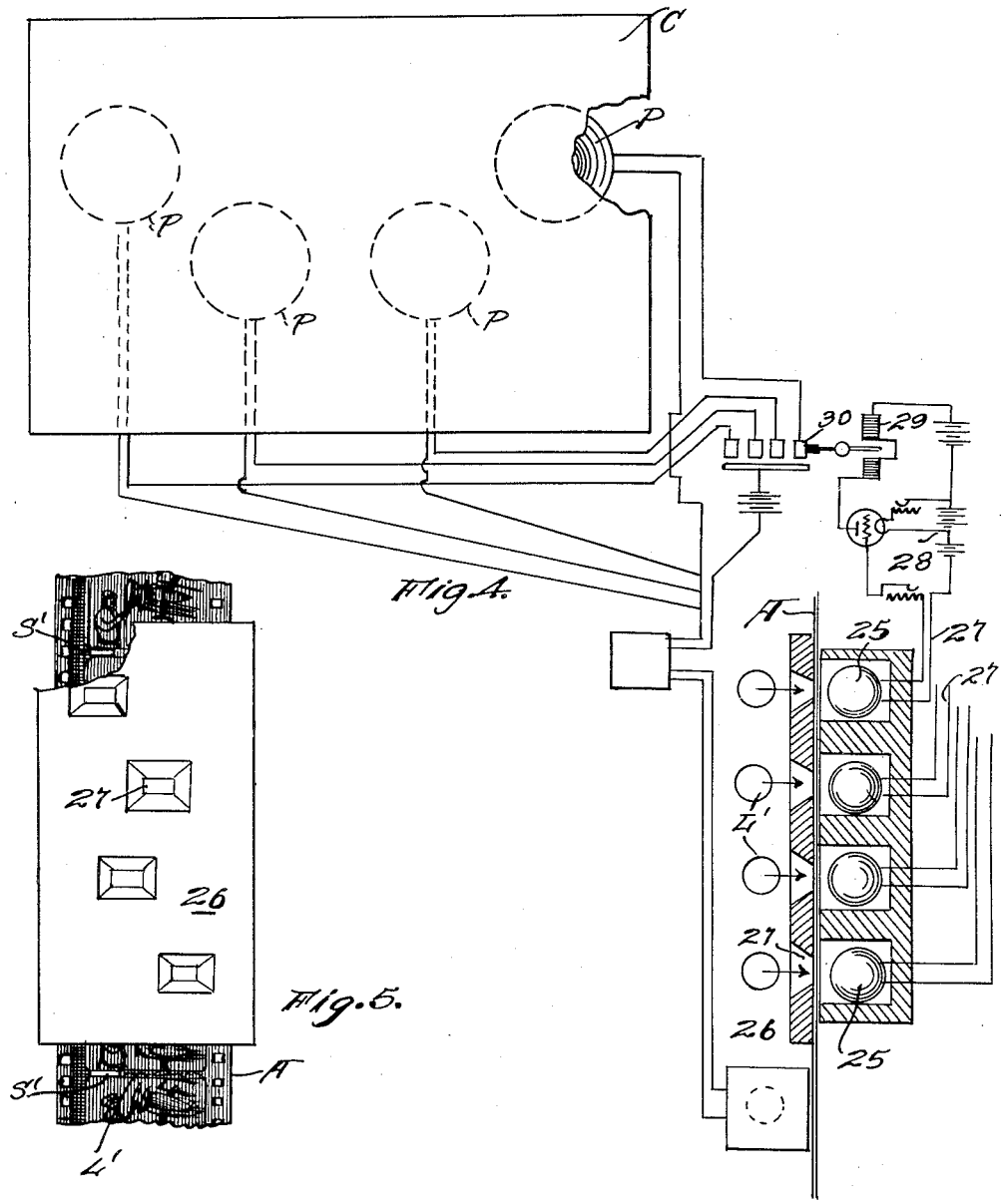

1,793,772

UNITED STATES PATENT OFFICE

WIKKE BOUMA, OF HOLLYWOOD, CALIFORNIA, ASSIGNOR OF ONE-THIRD TO THOMAS L. TALLEY, OF LOS ANGELES, CALIFORNIA, AND ONE-THIRD TO THEO. M. DE LE GARDE, OF HOLLYWOOD, CALIFORNIA

APPARATUS AND METHOD FOR LOCALIZATION OF SOUND ON SCREENS

Application filed February 26, 1929. Serial No. 342,808.

This invention relates to the science of talking motion pictures and most particularly to a method of treating or exposing the negative film while taking a picture and to the reproduction from the negative of a positive film with the object of the localization of the reproduced sound on that portion of the screen from which the sound reproduced apparently originates.

One of the conspicuous defects in present day talking pictures is that during the reproduction of a picture on a screen concurrently with the sound reproduction consonant with the scene the sound reproducer does not cause the sound to originate at or near that portion of the projected scene or pictures from which in actuality the sound would originate during the filming of the picture.

For instance, during the projection of a picture of a singing quartette when any of the singers is singing alone and may be at either end of the line of singers, present day reproducers cast the sound only from given sources irrespective of the fact that the singer may be at an extreme corner of the projected scene with the result that the sound pictures have an unnatural and false impression.

It is the general purpose of the present invention to provide a method and means for filming a scene and for reproducing the picture in accompaniment with the desired sounds and especially to provide for the reproduction of the sounds immediately at that portion of the screen contiguous to the agent in the picture from which the sound apparently originates.

It is an object to provide a method and means whereby an operator during the filming of a picture may cause an image to be impressed on a portion of the travelling film in definite relation to the general portion of the scene being pictured and at which the sound, to be ultimately reproduced, actually originates, in the original scene, play, or performance. In other words it is an object to so affect the running film in accordance with the picture and the locality of sounds being recorded concurrently that the affected film is a master means for a subsequently produced positive through the medium of which any suitable sound reproducing means may be controlled as to produce sounds at or close to that portion of the picture from which the original sound in the actual scene emanated and therefore the invention consists of a method and means for the selective localization of sound by the energization of one or another of sound reproducers in predetermined position at the screen onto which a talking or sound picture is being cast.

While the term "film" is used as example of media on which the change of source of sound is indicatively recorded it is to be understood that the indicative record may be made on any desired or appropriate material and while the record is herein described as of photographic character it is understood that various kinds of recording media and mechanism and other well known agents may be resorted to to the end of obtaining a useful record for the effective control of appropriate apparatus employed in the ultimate reproduction of the sound picture.

Additional objects, advantages and features of the method and apparatus whereby it may be performed will be made manifest in the ensuing description of the herewith illustrative embodiment; it being understood that modifications, variations and adaptations may be resorted to within the spirit, scope and principle of the invention as it is hereinafter claimed.

Fig. 1 is a schematic perspective of apparatus for making the original negative of a given picture and producing a master control medium on the film to effect the selection of predetermined loud-speaking apparatus energized during the reproduction of the filmed scene.

Fig. 2 is an elevation of the master, spot producing device through which a negative film is traversed during picture making and showing portions of a film negative after development.

Fig. 3 is a perspective of a spot shutter.

Fig. 4 is a schematic diagram of a picture screen and loud speaker apparatus and a combined sound localization, positive traversed instrumentality for automatic selection of given sound-reproducing apparatus in accordance with the locality, in the screen from which the sound is localized according to the source of the sound in the original scene or performance depicted by the reproduced picture.

Fig. 5 is a front elevation of the localization instrumentality and showing a positive passing therethrough.

According to the present invention it is desirable to produce a picture negative film F characterized by certain portions of its area being specially differentiated by a light impression which is produced at a predetermined position on the film in certain coordinate relation to portions of the picture immediately adjacent to the said differentiated film area. For instance, it is desirable to make a special differentiation by a light spot whose position is determined on the film according to the general locality in the scene being filmed from which sound originates and is recorded by suitable apparatus synchronously with the making of the film of the scene.

A motion picture negative has its successive picture zones, which are commonly called "picture frames" which are separated by narrow transverse zones known as the "frame lines" here designated L. This zone of separation or frame line is equal to the length of the picture frame and is of such width as to be very apparent and a feature of the present invention is to utilize this frame line L as an area which may be divided transversely by oblong spots S whose position along the frame may be selected at will by an operator in accordance with the area in a pictured scene at which sounds, to be recorded, originate. In other words the spots S in the frame lines L may be arranged at will by the operator as the locality of sounds to be recorded, and later reproduced, may be changed from one position to another in the objective scene being filmed.

The negative film with such special localized spots S is used as a master for subsequently made positives A and on the positive the spot zones S' provide the means for control of one or another of a battery or batteries of sound reproducing apparatus P at respective portions of a projection screen A onto which images are cast by suitable apparatus from the film negative F; the sound producing apparatus being operated in synchronism with the projected pictures from the negative.

One form of apparatus for enabling localization of sound is shown as including a box 2 arranged close to the aperture plate 3 of a camera and from which plate the exposed negative film F passes into the box 2 and thence away. Means are provided to subject each frame line L adjacent to a picture impression to the effect of a portion of a beam of light as from a lamp 5 so that a selected zone of the frame line L will be exposed. Means for controlling the locality of the exposed portion of the frame line L, as here shown, consists of a series of windows 6 in the box 2 and between which windows and the film F is arranged a set of shutters 7 each having an aperture 8 registerable with its respective window in the box 2 so that by moving any shutter its aperture 8 will then register with its window 6 and a beam of light from the lamp 5 will pass through and act on the negative and produce a black spot in the developed negative.

Means for the selection of the control shutter 7 may be of various forms and as here shown each shutter has a head block 9 capable of being attracted to a magnet 10, of which there is one for each shutter. Each magnet has an individual electric circuit including a common line 11 to a battery 12 and an individual return line 13 provided with a contact 14. Each contact 14 is engageable by its respective switch contact 15—15'.

As shown in Fig. 1 there are four shutters 7 and four respective magnets 10 and contacts 14 at stations #1, #2, #3, and #4 on a switch board B. Preferably the contact 15 between stations #1 and #2 is of such form that the two circuit contacts thereat may be simultaneously engaged by pressure on a switch button 17 secured to a switch arm 18 so that two magnets 10 which are adjacent to each other may be energized and effect the opening of two contiguous shutters 7 at will. The contact 15 between stations #1 and #2 may be thrown to engage either of the contiguous contacts 14 and thus close only one magnet circuit as desired. Between the contact stations #3—#4 is a switch member 15' engageable with either or both of the contacts 14 by action of the switch 19, which with the switch 18 is joined to the circuit line 20 to the battery to complete the magnet circuits.

During the filming of a scene and exposure of the film F in the aperture plate 3 the operator closely watching the scene or performance will manipulate the switches 18 and 19 so as to energize one of the shutter magnets correlated to the stations #1, #2, #3, and #4 these being selected by the operator in accordance with the general locality of the filmed scene at which sound emanates and is being recorded so that there will be a line of spots S on the film negative F more or less in a zone train at selected portions of the frame line L as determined by the closed circuit magnet and open shutter 7. It will be understood that because of the rapidity of the motion of the film through the aperture and spotting box 2 a large number of lines L will have their spot zones S in alignment successively along the film and as the general locality of the sound in the pictured scene changes the operator will by action of the control switches 18—19 then change the train of spots S by action of the selected shutter 7 as is indicated at S and S$^x$, Fig. 2.

From the spotted negative F is made a positive film A from which pictures are to be projected onto the screen C and in the positive film A the selected light spots S' appear clear or transparent.

This film with the clear zones or spots S' in their given positions is utilized as a means to control the energization of a battery of sound producers P or groups of producers which are arranged in suitable position at the rear of the screen C so that when a picture is projected thereto that sound producer will be energized which is at general locality of the picture depicting that portion of the original scene at or near which the original sound generated.

Means are shown in Fig. 4 for the transmission of light from lamps L' through the positive A to a bank of light sensitive devices 25 isolated from each other and receiving the light through a register 26 between which and the bank of devices 25 the film positive is traversed during the projection of a picture to the screen C. The devices 25 may consist of photoelectric cells each having an electric circuit 27 which may be stepped up or relayed by an associated circuit 28, or any suitable number thereof so as to finally energize a magnet 29 operating a switch 30. It will be understood that there is a step-up circuit and a switch 30 for each light sensitive device 25.

It will be seen that as the positive A runs through the register 26 light will pass to register windows 27 and then through such clear light record spots S' as may register with the windows 27; these being offset so that each will register only with that light spot S' in alignment therewith in the frame line L'.

Therefore in the present method of reproducing sound-pictures the master or controlling light spots S' will permit the passage only to coordinate of the sensitive devices 25 which will serve when excited to close its respective circuit 27 and effect the operation of its respective switch 30 and closure of circuit of the respective sound-reproducer P. Consequently during reproduction of a scene the speakers will be energized in accordance with the locality in the image corelative to the locality at which the original sound emanated in the original scene.

Since the beam of light passing through any opened window 6 would be exposed to the picture in the picture frame it is obvious that a suitable means will be provided to cut off the passage of light to any part of the film except only a proper portion as determined in the frame line by an open shutter 7. Therefore a shutter D is shown in Fig. 2 operatively timed so as to permit the passage of light to the film F only while a frame line is registered with the row of windows 6.

What is claimed is:

1. The method for the localization of source of sound at a projected picture screen which consists of making a negative film of the scene, simultaneously making light impressions thereon between frames at different zones determined by locality, of sound in the scene, reproducing a positive from the negative, and utilizing the reverse impression characters to control the energization of selective sound-reproducers.

2. In a method of localization of sound in sound-picture reproduction, that step consisting of making light impressions on the film negative frame bars at selective positions varied according to locality of sound origin in the filmed scene concurrently with the exposure of the film to the scene.

3. The method of facilitating localization of sounds in sound-picture reproduction including making light impressions at zones on the negative film frame bars as determined by locality of sound origin in a filmed scene or performance concurrently with the filming of the scene.

4. The method of facilitating localization of sounds in sound-picture reproduction including making impressions along the frame lines of respective frames of a motion picture negative film in positions along the line varied according to change of position of source of sound to be recorded, in the scene or performance being filmed concurrently with the filming of the scene.

5. The making of master light impressions along the frame lines of a picture negative film at positions changing with change of source of sound in the subject photographed concurrently with the filming of the picture.

6. A battery of sound reproducers disposed in chosen positions at a picture screen, a sound-picture film having a record thereon including light-passing windows in frame lines indicative of variation of location of source of sound in the original scene, and means controlled by the passage of light through the windows to selectively energize respective reproducers in accordance with the apparent locality of the sound, controlled by the film sound record in the picture projected to the screen.

7. Sound-record picture making apparatus including a camera having a means effective to indicate on picture film frame lines change of locations of source of sound in a scene or performance, concurrently with the exposure of the film to the scene and including selective devices to determine positional relation of the indications.

8. A picture projecting strip with a sound record part whose picture frames are provided with a light record media indicative of change of location of source of the recorded sound as occurring in the original scene.

9. A picture projecting sound-record strip whose picture frames are provided with a record media indicative of change of location of source of the recorded sound as occurring in the original scene and means operatively controlled by said media to selectively energize one or more of a battery of associated sound-reproducers.

10. Sound-record, picture apparatus including a camera, for progressive film operation and exposure, having means for making light impressions selectively along the frame lines of the film concurrently with the progressive filming of a scene to indicate locale changes of the source of the sound recorded on the film.

11. Picture apparatus including a camera for progressive film operation and exposure having means for making light impressions selectively along the frame lines of the film to indicate changes of position of the source of sound features coordinate to the scene and which are to be reproduced with the projection of the picture from the film, and a manually operated control device for said means.

12. Motion picture apparatus including a camera for progressively exposing a photographic film, having a plurality of independent shutters for selectively exposing zones of picture frame bars, a source of light combined with the camera to show through an open shutter to the film bars, and means to operate the shutters selectively according to locality of source of sound at the scene being photographed.

13. Motion picture apparatus including a camera for progressively exposing a photographic film, having a series of independent shutters for exposing respective zones of the picture frame bars, light means operative through the open shutters upon the said bars, means to operate said shutters selectively according to locality of source of sound at scene being photographed and including an electrical control for each shutter.

14. A camera for progressively exposing a photographic film and having a series of independent shutters for exposing respective zones of picture frame bars to light, electrical means to selectively operate said shutters and including a manually operated, master switch device.

15. A camera for exposing a motion picture film and having a series of independent shutters for exposing respective zones of picture frame bars to light, electrical operating means for said shutters, and a master switch device movably combined with the camera so as to be shifted to remote positions relative thereto.

16. Apparatus for effecting a change of source of sound in sound picture projection, including a battery of sound reproducers, a picture film having a synchronous, correlative sound record in combination and having on its frame bars a record of changes of locality of sound relative to the picture scene, and means for selecting the respective reproducers according to locality as determined by the change record and including a projector register having photoelectric cells for the reproducers, and a series of exciting lamps whose light flow to the cells is controlled by the change record on the film.

17. Apparatus for effecting a change of source of sound in sound picture projection, including a battery of sound reproducers, a sound record and a motion picture record, the latter having a light record indicative of change of locality of source of sound in the original scene, and photoelectric means controlled by said light record for selecting a given reproducer to effectively reproduce a sound as determined by the master sound record.

WIKKE BOUMA.